United States Patent [19]

Tzikas

[11] 4,298,536
[45] Nov. 3, 1981

[54] PROCESS FOR THE MANUFACTURE OF 1,2-DIAMINOANTHRAQUINONE

[75] Inventor: Athanassios Tzikas, Pratteln, Switzerland

[73] Assignee: Ciba-Geigy Ag, Basel, Switzerland

[21] Appl. No.: 33,404

[22] Filed: Apr. 26, 1979

[30] Foreign Application Priority Data

Apr. 28, 1978 [CH] Switzerland ............... 46508/78

[51] Int. Cl.$^3$ .................................... C07C 97/24
[52] U.S. Cl. ........................... 260/378; 260/376; 260/377
[58] Field of Search ............... 260/378, 377, 376, 381, 260/649

[56] References Cited

U.S. PATENT DOCUMENTS

| | | | |
|---|---|---|---|
| 2,433,551 | 12/1947 | Gutzwiller | 260/381 |
| 3,997,573 | 12/1976 | Jager et al. | 260/378 |
| 4,016,182 | 4/1977 | Buecheler | 260/372 |

FOREIGN PATENT DOCUMENTS 2452413  5/1976  Fed. Rep. of Germany.
383625 11/1932  United Kingdom ............... 260/378

OTHER PUBLICATIONS

*Chemical Abstract* vol. 82 #126611m, 1975 Buecheler "Aminoanthraquinones by Reduction of Nitroanthraquinones".

*The Producing and use of Nitro Derivatives of Anthraquinone in the Synthesis of Dyes,* Orq picheskia polyprodukty i krasitdi, No. 4, 1969, pp. 11–12, by Moiseeva.

*Primary Examiner*—Winston A. Douglas
*Assistant Examiner*—Raymond K. Covington

[57] ABSTRACT

A process for the manufacture of 1,2-diaminoanthraquinone, which comprises reacting 1-nitro-2-acetylaminoanthraquinone with hydrazine or hydroxylamine, or with derivatives thereof, in protic solvents.

7 Claims, No Drawings

PROCESS FOR THE MANUFACTURE OF 1,2-DIAMINOANTHRAQUINONE

The present invention provides a process for the manufacture of 1,2-diaminoanthraquinone, which comprises reacting 1-nitro-2-acetylaminoanthraquinone with hydrazine or hydroxylamine, or with derivatives thereof, in protic solvents.

The following compounds may be cited as examples of reducing agents for the process of the invention: hydrazine, hydrazine hydrate, methyl hydrazine, ethyl hydrazine, phenyl hydrazine, hydrazinium chloride, hydrazinium dichloride, hydrazinium sulfate, hydrazinium bromide, benzenesulfonyl hydrazide, hydroxylamine, hydroxylamine hydrochloride, hydroxylammonium sulfate, hydroxylaminesulfonic acid. The preferred reducing agent is hydrazine hydrate or hydroxylamine hydrochloride.

Suitable protic solvents for the process of the invention are aqueous, aqueous-organic or organic media. Particularly suitable organic media are protic solvents which are inert under the reaction conditions and which are readily miscible with water. Suitable protic solvents are in particular: water, methanol, ethanol, propanol, isopropanol, n-butanol, isobutanol, benzyl alcohol, diethylamine, triethylamine, aniline.

Instead of using pure, homogeneous solvents, it is also possible to use mixtures, in particular mixtures of water and protic solvents, such as water and methanol or water and ethanol. The reaction is preferably carried out in a mixture of alcohol and water. The ratio of alcohol to water can vary; preferably an excess of water is used. The reaction is carried out in particular in mixtures of methanol and water or ethanol and water.

The reaction is carried out in a basic medium, preferably in a strongly basic medium, for example at a pH value of at least 10. The pH value is adjusted preferably by addition of an alkali metal hydroxide, in particular sodium hydroxide or potassium hydroxide.

The reaction temperature can vary in any range compatible with the reactants, preferably in the range between room temperature and the boiling temperature of the reaction mixture. It is particularly advantageous to begin the reaction at room temperature and to bring it to completion by raising the temperature to near that of the boiling range. An advantageous temperature range for the reaction is that from about 0° C. to 100° C. The reaction products can be isolated from the reaction mixture in a manner known per se. They are valuable intermediates for the manufacture of vat dyes, pigments and disperse dyes.

The invention is illustrated by the following Examples, in which the parts and percentages are by weight unless otherwise stated. The relationship of parts by weight to parts to volume is the same as that of grams to milliliters.

EXAMPLE 1

10 parts of 1-nitro-2-acetylaminoanthraquinone and 4 parts of hydrazine hydrate are suspended at room temperature in 60 parts of methanol and 100 parts of 4 N sodium hydroxide. The mixture is refluxed for 3 hours, then cooled to room temperature and diluted with water. The reaction mixture is subsequently filtered and the filter cake is washed neutral with water and dried.

Yield: 7.3 parts of 1,2-diaminoanthraquinone. The melting point of the crude product is 302°-305° C. Recrystallisation from nitrobenzene yields an analytically pure sample with a melting point of 304°-305° C.

EXAMPLE 2

10 parts of 1-nitro-2-acetylaminoanthraquinone and 4 parts of hydrazine hydrate are suspended at room temperature in 60 parts of ethanol and 100 parts of 4 N sodium hydroxide. The mixture is refluxed for 3 hours, then cooled to room temperature and diluted with water. The reaction mixture is subsequently filtered and the filter cake is washed neutral with water and dried.

Yield: 7.2 parts of 1,2-diaminoanthraquinone.

EXAMPLE 3

10 parts of 1-nitro-2-acetylaminoanthraquinone and 10 parts of hydroxylamine hydrochloride are suspended at room temperature in 60 parts of ethanol and 100 parts of 4 N sodium hydroxide. The mixture is refluxed for 3 hours, then cooled to room temperature and diluted with water. The reaction mixture is subsequently filtered and the filter cake is washed neutral with water and dried.

Yield: 7.3 parts of 1,2-diaminoanthraquinone.

EXAMPLE 4

10 parts of 1-nitro-2-acetylaminoanthraquinone and 10 parts of hydroxylamine hydrochloride are suspended at room temperature in 60 parts of methanol and 100 parts of 4 N sodium hydroxide. The mixture is refluxed for 3 hours, then cooled to room temperature and diluted with water. The reaction mixture is subsequently filtered and the filter cake is washed neutral with water and dried.

Yield: 7.4 parts of 1,2-diaminoanthraquinone.

The same end product is obtained in the same high yield by using the same amount of 4 N potassium hydroxide instead of sodium hydroxide in each of the foregoing Examples.

EXAMPLE 5

31 parts of 1-nitro-2-acetylaminoanthraquinone and 5 parts of hydrazine hydrate are suspended at room temperature in 120 parts of n-propanol and 200 parts of 2% sodium hydroxide. The mixture is stirred for 3 hours at 40°-45° C., then cooled to room temperature and diluted with water. The reaction mixture is subsequently filtered and the filter cake is washed neutral with water and dried.

Yield: 22 parts of 1,2-diaminoanthraquinone.

EXAMPLE 6

10 parts of 1-nitro-2-acetylaminoanthraquinone and 5 parts of hydrazinium sulfate are suspended at room temperature in 60 parts of isopropanol and 100 parts of 4 N sodium hydroxide. The mixture is stirred for 3 hours at 40°-45° C., then cooled to room temperature and diluted with water. The reaction mixture is subsequently filtered and the filter cake is washed nuetral with water and dried.

Yield: 7.1 parts of 1,2-diaminoanthraquinone.

The same end product is obtained in the same good yield by using, instead of hydrazinium sulfate, the same amount of hydrazinium dichloride, hydrazinium dibromide, hydrazinium chloride or hydrazinium bromide.

EXAMPLE 7

10 parts of 1-nitro-2-acetylaminoanthraquinone and 5 parts of hydrazine hydrate are suspended at room temperature in 120 parts of 4 N potassium hydroxide. The mixture is stirred for 3 hours at 60° C., then cooled to room temperature and diluted with water. The reaction mixture is subsequently filtered and the filter cake is washed neutral with water and dried.

Yield: 7 parts of 1,2-diaminoanthraquinone.

EXAMPLE 8

10 parts of 1-nitro-2-acetylaminoanthraquinone and 10 parts of hydroxylammonium sulfate are suspended at room temperature in 120 parts of 5% ethanolic solution. The mixture is stirred for 3 hours at 45° C., then cooled to room temperature and diluted with water. The reaction mixture is subsequently filtered and the filter cake is washed neutral with water and dried.

Yield: 7.2 parts of 1,2-diaminoanthraquinone.

The identity of the products obtained according to Examples 1 to 8 was confirmed by comparison with commercially available, analytically pure 1,2-diaminoanthraquinone. This comparison was carried out by means of thin-layer chromatography using different solvents. In addition, samples of the end products of a number of Examples were recrystallised from nitrobenzene and subjected to elemental analysis. The results of the analyses gave the empirical formula of 1,2-diaminoanthraquinone and thus confirmed the data obtained by thin-layer chromatography.

What is claimed is:

1. A process for the manufacture of 1,2-diaminoanthraquinone, which comprises reacting 1-nitro-2-acetylaminoanthraquinone with hydrazine or hydroxylamine, or with derivatives thereof, in protic solvents.

2. A process according to claim 1, which comprises the use of hydrazine hydrate.

3. A process according to claim 1, which comprises the use of hydroxylamine hydrochloride.

4. A process according to claim 1, wherein the reaction is carried out in mixtures of alcohol and water.

5. A process according to claim 4, wherein the reaction is carried out in mixtures of methanol and water or ethanol and water.

6. A process according to claim 1, wherein the reaction is carried out at a basic pH value.

7. A process according to claim 6, wherein the pH is adjusted by addition of an alkali metal hydroxide.

* * * * *